Nov. 12, 1935.  A. J. MYHREN ET AL  2,020,850
APPARATUS FOR MIXING LIQUIDS AND GASES
Filed Dec. 15, 1933
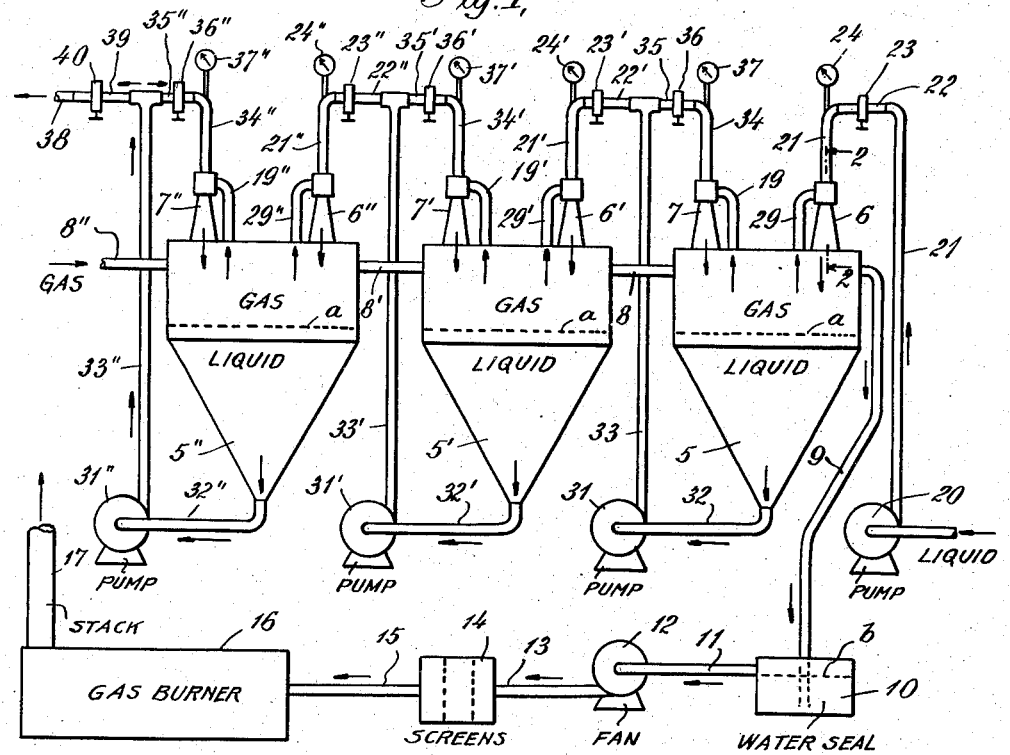
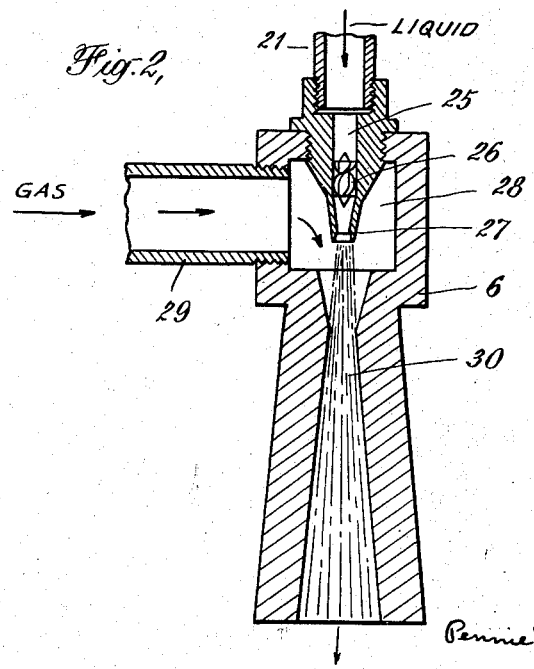
INVENTORS
ARNE J. MYHREN.
BYRON MARQUIS,
BY
ATTORNEYS Patented Nov. 12, 1935

2,020,850

UNITED STATES PATENT OFFICE 2,020,850

APPARATUS FOR MIXING LIQUIDS AND GASES

Arne J. Myhren and Byron Marquis, Palmerton, Pa., assignors to The New Jersey Zinc Company, New York, N. Y., a corporation of New Jersey Application December 15, 1933, Serial No. 702,579

10 Claims. (Cl. 261—76)

The present invention relates to apparatus for bringing liquids or slurries into intimate contact with gases, and has for its object the provision of an improved apparatus of this character. The invention contemplates more particularly a novel combination of eductors with tanks and pumps for the circulation of liquids and gases, so arranged that intimate contact between the liquid and gas may be established by repeatedly causing the liquid to entrain the gas in a number of eductors operated in series.

These and other objects of the invention will be more readily understood by reference to the accompanying drawing, in which:

Fig. 1 is a diagrammatic elevation of an apparatus embodying the invention.

Fig. 2 is a section on the line 2—2 of Fig. 1, showing in detail the construction of the Venturi tube eductor 6, and likewise that of the eductors 6', 6'', 7, 7' and 7'' in Fig. 1.

The apparatus illustrated in the drawing comprises three tanks 5, 5', 5'' (arranged in series), of circular cross-section and with conical bottoms, each tank being provided with two Venturi tube eductors 6 and 7, 6' and 7', and 6'' and 7'', respectively. The series of tanks is provided with a gas inlet pipe 8'' (entering the top portion of tank 5'') and a gas outlet pipe 9 (discharging from tank 5). A gas pipe 8' connects the top portions of tanks 5'' and 5' and a gas pipe 8 connects the top portions of tanks 5' and 5. The system of pipes 8'', 8', 8 and 9 connects the tanks in series at points above the normal level (a) of liquid or slurry therein in such fashion that gas can flow freely through the series of tanks.

The gas outlet pipe 9 dips below the liquid-level (b) in a water seal 10. The gas-space above the liquid-level (b) in the water seal 10 is connected by a pipe 11 with the suction side of a fan 12. The pressure side of the fan 12 is connected by a pipe 13 with a screen-box 14, which contains metal screens (preferably made of a metal of high heat conductivity such as copper) set across the path of the gases therethrough. The screen box 14 is connected by a pipe 15 to a gas burner 16, provided with a stack 17.

It is to be understood that the screen box 14 and the burner 16 are of particular utility when the gas utilized is combustible. In that case, the metal screens in the box 14 prevent back-firing of the flame in the gas burner 16. In case the gas used is not combustible, the screen box 14 and the burner 16 may be dispensed with. The water seal 10 is of utility not only as a further safe-guard against back-firing, but also as a means of regulating the effective suction of the fan 12. The effective suction of the fan 12 on the outlet pipe 9 may be increased by lowering the water-level (b) in the water seal 10, and decreased by raising the water level. Moreover, the water seal 10 prevents the entrance of air into the tank 5 when the fan 12 is shut down, for example for the purpose of attaching a spare fan.

The tanks 5, 5' and 5'' are provided with pumps for liquid and/or slurry transport, and pipe lines for liquid or slurry are appropriately connected with the pumps, tanks and Venturi tube eductors in such fashion that liquid and/or slurry can be transported through the series of tanks and likewise partly recirculated in the individual tanks, while being brought into intimate contact with gas traversing the series of tanks in general counter-current with the liquid and/or slurry. Each of the six Venturi tube eductors (6, 7, 6', 7', 6'' and 7'') is arranged to recirculate gas through the tank with which it is operatively associated, while intimately mixing the gas with the liquid and/or slurry. The Venturi tube eductor 6 introduces liquid into the system by discharging it into tank 5. The Venturi tube eductors 7, 7' and 7'' serve to recirculate liquid or slurry through the tanks with which they are connected (through tanks 5, 5' and 5'', respectively). The Venturi tube eductors 6' and 6'' serve to convey liquid or slurry from one tank into the next tank in the series. Thus, Venturi tube eductor 6' serves to convey liquid or slurry (withdrawn from tank 5) into tank 5'; and Venturi tube eductor 6'' serves to convey liquid or slurry (withdrawn from tank 5') into tank 5''.

The apparatus shown in Fig. 1 will now be described in greater detail:

A pump 20 is connected on its suction side to a source of liquid (not shown). On its pressure side, the pump 20 is connected with a pipe 21, part of which consists of the rubber hose segment 22, provided with a pinch valve 23. The pipe 21 leads to the Venturi tube eductor 6. Between the pinch valve 23 and the eductor 6, the pipe 21 is provided with a pressure gauge 24, for indicating the rate of delivery of liquor to the Venturi tube eductor 6.

The structure of the Venturi tube eductor 6 will be more clearly understood by reference to Fig. 2. The pipe 21 connects with a duct 25, in which is placed a spiral baffle 26. The duct 25 terminates in a discharge nozzle 27 in a gas chamber 28, connected by a pipe 29 to the upper portion of the tank 5 (i. e., the portion of the tank 5 above the line of normal slurry or liquid level a therein). The nozzle 27 is placed concentrically with a Venturi tube 30 communicating with the gas-chamber 28 at a point opposite the nozzle 27.

Referring again to Fig. 1, the suction side of a pump 31 is connected by a pipe 32 to the discharge orifice at the tip of the conical bottom of tank 5. The pressure side of pump 31 is connected to a pipe 33, dividing at its upper end into a branch pipe 34 leading back into the tank 5 through the Venturi tube eductor 7, and into branch pipe 21', leading into the Venturi tube eductor 6'. The branch pipe 34 is provided with the rubber hose segment 35, equipped with the pinch valve 36, and is also provided with the pressure gauge 37, between the pinch valve 36 and the Venturi tube eductor 7. The branch pipe 21' is likewise provided with a rubber hose section 22' equipped with a pinch valve 23', and provided with a pressure gauge 24' between the pinch valve 23' and the Venturi tube eductor 6'. It will be readily understood that the relative amounts of liquid (or slurry) entering the branch pipes 34 and 21', respectively, can be appropriately regulated, as hereinafter more particularly explained, by appropriate adjustment of the pinch valves 23' and 36, respectively; and that the relative amounts of liquid or slurry flowing through the pipes 21' and 34 can be determined at any time by comparing the reading of the gauges 24' and 37.

The structure of the Venturi tube eductors 6', 7, 7', etc. is the same as that of Venturi tube eductor 6 hereinbefore described. Pipes 19, 19' and 19'' connect the upper portion of the tanks 5, 5' and 5'' with the gas chambers of the Venturi tube eductors 7, 7' and 7'', respectively.

The structure and arrangement of the pump 31', pipes 32' and 33', branch pipe 34' with the rubber hose segment 35', pinch valve 36' and gauge 37', branch pipe 21'' with the rubber hose segment 22'', pinch valve 23'' and gauge 24'', and the Venturi tube eductors 7' and 6'', are the same with respect to tanks 5' and 5'' as the structure and arrangement of the correspondingly identified elements described with respect to tanks 5 and 5'.

The pump 31'' is connected on its suction side to the pipe 32'' communicating with the discharge orifice in the conical bottom of the tank 5''. The pressure side of the pump 31'' is connected to the pipe 33'', which divides into the branch pipe 34'' (connecting with the Venturi tube eductor 7'') and branch pipe 38, which serves as an outlet for the discharge of liquid or slurry from the system. The branch pipe 34'' is provided with the hose segment 35'', having the pinch valve 36'', and with the pressure gauge 37''. The discharge pipe 38 is provided with a hose segment 39, equipped with a pinch valve 40. It will be understood that the relative amounts of liquid or slurry discharged through the pipe 38 and returned to the tank 5'' through the Venturi tube eductor 7'' can be regulated by appropriate adjustment of the valves 40 and 36'', and that the amount of liquid or slurry entering the Venturi tube eductor 7'' can be determined at any time by reading the gauge 37''.

The apparatus shown in the drawing may be advantageously operated as follows:

Gas is introduced into the series of tanks through the inlet 8'', and is drawn through the tanks, the outlet pipe 9, and the water seal 10 by the suction produced by the fan 12. The effective suction of the fan 12 can be adjusted and regulated by suitable adjustment of the water-level $b$ in the water-seal 10. It will be understood that when the liquid used in the apparatus absorbs gas either by solution or chemical reaction, the suction produced by the gas absorption likewise tends to draw gas into the system through the pipe 8''. The water-seal 10 prevents air from entering the system when the fan 12 is shut down for any reason, as for example, for the purpose of attaching a spare fan to the gas outlet line 9.

In case a combustible gas is used, the fan 12 forces the gas through the line 13, the screen box 14 and the line 15 to the gas burner 16. The products of combustion are removed from the burner 16 by the stack 17. Back-firing of the flame from the burner 16 into the system is guarded against by metal screens (made of a metal of high heat conductivity, e. g. copper) placed in the path of the gases in the screen-box 14. The water-seal 10 is a further safe guard against back-firing.

Liquid is introduced (preferably continuously) into the system by the pump 20, which delivers liquid to the Venturi tube eductor 6 through the pipe 21. The amount of liquid transported by the pump 20 through the pipe 21 can be regulated by adjustment of the pinch valve 23 on the hose segment 22. The rate of flow of liquid into the Venturi tube eductor 6 is indicated by the pressure gauge 24, connected in the pipe line 21 at a point between the Venturi tube eductor 6 and the pinch valve 23.

From the pipe 21, the liquid enters the duct 25 of the Venturi tube eductor 6. A swirling motion is imparted to the liquid flowing through the duct 25 by the spiral baffle 26. The swirling stream of liquid then passes through the nozzle 27 in the form of a conical expanding jet into the gas chamber 28. The jet traverses the gas-chamber 28 and enters the Venturi tube 30, which is concentric and coaxial with the nozzle 27. In the Venturi tube 30, the velocity of the jet of liquid is sufficiently increased by the constriction of the Venturi tube to create suction in the gas chamber 28. Gas is thus withdrawn from the gas-chamber 28 by the suction of the Venturi tube and by entrainment in the jet of liquid. The suction in the gas-chamber 28 draws gas through the pipe 29 into the gas-chamber from the upper part of the tank 5. The Venturi tube 30 discharges this gas, together with the liquid, into the tank 5. The gas is brought into intimate contact with the liquid in the form of thin films and small droplets in the Venturi tube 30. The Venturi tube eductor is preferably so operated as to entrain with the liquid a volume of gas greatly in excess of the volume of liquid; for example, the volume of gas carried through the Venturi tube eductor by the liquid may be from 30 to 50 times the volume of the liquid, or even more.

When the gas and liquid treated by the apparatus react to form a precipitate (as for example, when the gas is hydrogen sulfide and the liquid an aqueous solution of zinc sulfate, which react to form a precipitate of zinc sulfide; or when the gas is carbon dioxide and the liquid lime water or milk of lime, which react to form a precipitate of calcium carbonate), the Venturi tube eductor 6 discharges a slurry or suspension of precipitate into the tank 5. It should be understood that this slurry is then treated as a liquid in the subsequent operations. In the continuation of the description hereinafter, the term liquid is used to include either a liquid or a slurry, such as is produced by the reaction of the gas with the liquid to form a solid precipitate.

The liquid charged into the tank 5 through the Venturi tube eductor 6 is withdrawn from the discharge orifice in the conical bottom of the tank through the pipe 32 by the pump 31, which forces the liquid through the pipe 33, into the branch pipes 34 and 21'. The relative amounts of liquid flowing into these two branch pipes are regulated by appropriate adjustments of the pinch valves 36 and 23', and the pressure gauges 37 and 24', respectively, indicate the prevailing pressures, and thus the rates of flow, in these two branch pipes. The liquid entering the Venturi tube eductor 7 is mixed therein with gas taken from the tank 5, and then returned to tank 5. The Venturi tube eductor 7 functions with respect to mixing the gas and liquid in the same manner as the Venturi tube eductor 6. The liquid entering the branch pipe 21' passes into the Venturi tube eductor 6', which functions in the same manner as Venturi tube eductor 6, which respect to mixing the liquid with gas (except that, as will be evident from the drawing, the Venturi tube eductor 6' draws gas through its gas-pipe 29' from the tank 5'). The Venturi tube eductor 6' discharges liquid into the tank 5' and thus transports liquid from tank 5 to tank 5', and the Venturi tube eductor 7 returns liquid to the tank 5.

It will be understood that in order to secure a desirable uniform and constant flow of liquid through the apparatus, the Venturi tube eductor 6' must transfer to tank 5' an amount of liquid corresponding to that entering the tank 5 through the Venturi tube eductor 6. The rate of discharge of Venturi tube eductor 6' may be suitably controlled with this end in view by appropriate adjustment of the pinch valves 23' and 36.

It will also be understood that the capacity of the pump 31 must in consequence be adequate to pump all the liquid supplied to tank 5 by pump 20 plus the amount of liquid returned to tank 5 by the Venturi tube eductor 7.

The liquid charged into tank 5' by the Venturi tube eductor 6' is recirculated in tank 5' through the Venturi tube eductor 7' and transported to tank 5" through the Venturi tube eductor 6" in a manner similar to that hereinbefore described.

Liquid is withdrawn from tank 5" by the pump 31" through the line 32", and pumped into the line 33", whence it is in part discharged from the system through the line 38, and in part returned to tank 5" through the Venturi tube eductor 7". The ratio of the amount discharged through the line 38 to that returned to the tank 5" through Venturi tube eductor 7" is appropriately controlled by proper adjustment of the pinch valves 40 and 36". This adjustment is facilitated by the fact that the readings of pressure gauge 37" are an indication of the rate at which liquid is supplied to the Venturi tube eductor 7".

In order to secure uniform and continuous flow of liquid through the system, it will in general be desirable to adjust the amount of liquid discharged from the outlet 38 so that it corresponds to the amount of liquid fed into the system through the Venturi tube eductor 6, due allowance being made for any change in the volume of the liquid that may be produced in consequence of its contact with the gas; as for example, the formation of a slurry of a precipitate formed by reaction of the gas with the liquid; the condensation of vapor from the gas, or the absorption of mist in the liquid; or the evaporation of part of the liquid.

The apparatus of the invention permits the mixing of gases and liquids to a controlled degree. The intensity of mixing and the duration of contact between liquid and gas can be controlled by a regulation of the ratio of recirculation of the liquid through the individual tanks to the transport of liquid from tank to tank.

The apparatus is of especial utility in the precipitation of zinc sulfide by treating an aqueous solution of zinc sulfate with hydrogen sulfide according to our copending United States application Serial No. 702,578 filed December 15, 1933.

In the appended claims we have used the term liquid broadly to include slurries and the like, and by fresh liquid we mean liquid introduced for the first time into the tank irrespective of whether or not the liquid has been previously treated in preceding tanks in the series.

The apparatus illustrated in the drawing is susceptible of various modifications without departing from the principles and spirit of the invention. While we have found pinch valves particularly convenient in controlling the flow of liquid into the eductors, other suitable types of valves may be used. Ordinarily, each of the tanks 5, 5' and 5" is provided with a liquid level indicator of any suitable type for indicating the level ($a$) of the liquid or slurry therein.

We claim:

1. An apparatus for effecting intimate contact between a liquid and a gas comprising a tank partly filled with the liquid undergoing treatment therein, a Venturi tube eductor operatively associated with the tank for continuously charging thereinto above the liquid level therein fresh liquid admixed with gas withdrawn from the tank, a second Venturi tube eductor operatively associated with the tank for recirculating therethrough a certain amount of the liquid undergoing treatment therein by charging into the tank above the liquid level therein said recirculating amount of liquid intimately admixed with gas withdrawn from the tank, and means for continuously withdrawing from the tank an amount of liquid substantially equivalent to the amount of fresh liquid charged thereinto.

2. An apparatus for effecting intimate contact between a liquid and a gas comprising a series of tanks through which the liquid and gas pass generally in counter-current, a Venturi tube eductor operatively associated with each tank for recirculating therethrough a certain amount of the liquid undergoing treatment therein intimately admixed with gas withdrawn from that tank, another Venturi tube eductor operatively associated with each tank for introducing into the tank a fresh supply of liquid intimately admixed with gas, and means for withdrawing from the last tank in the series an amount of liquid substantially equivalent to the amount of fresh liquid introduced into the first tank in the series.

3. An apparatus for effecting intimate contact between a liquid and a gas comprising a series of tanks through which the liquid and gas pass generally in counter-current, a conduit communicating with the bottom of each of said tanks and with the top of that tank and with the top of the next succeeding tank in the series, a pump operatively included in said conduit, means associated with said conduit for controlling the relative amounts of liquid delivered thereby to the two tanks with which the conduit communicates, and means for withdrawing through the conduit of the last tank in the series an amount of liquid substantially equivalent to the amount of fresh liquid introduced into the first tank in the series.

4. An apparatus for effecting intimate contact between a liquid and a gas comprising a series of tanks through which the liquid and gas pass generally in counter-current, each of said tanks having a charging Venturi tube eductor and a recirculating Venturi tube eductor operatively associated therewith adapted to deliver to the tank liquid intimately admixed with gas withdrawn from the tank, a conduit communicating with the bottom of each of said tanks and with the recirculating eductor thereof and with the charging eductor of the next succeeding tank in the series, a pump operatively included in said conduit, and means for withdrawing through the conduit of the last tank in the series an amount of liquid substantially equivalent to the amount of fresh liquid introduced into the first tank in the series.

5. An apparatus for effecting intimate contact between a liquid and a gas comprising a series of tanks through which the liquid and gas pass generally in countercurrent, each of said tanks having a charging Venturi tube eductor and a recirculating Venturi tube eductor operatively associated therewith adapted to deliver to the tank liquid intimately admixed with gas withdrawn from the tank, a conduit communicating with the bottom of each of said tanks and with the recirculating eductor thereof and with the charging eductor of the next succeeding tank in the series, a pump operatively included in said conduit, means associated with said conduit for controlling the relative amounts of liquid delivered thereby to the recirculating eductor and the charging eductor with which the conduit communicates, and means for withdrawing through the conduit of the last tank in the series an amount of liquid substantially equivalent to the amount of fresh liquid introduced into the first tank in the series.

6. An apparatus for effecting intimate contact between a liquid and a gas comprising a series of tanks through which the liquid and gas pass in contact, a conduit communicating with the bottom of each of said tanks and with the top of that tank and with the top of an adjacent tank in the series, a flexible section included in the parts of said conduit communicating with the tops of said tanks and a pinch valve operatively associated with each of said flexible sections.

7. An apparatus for effecting intimate contact between a liquid and a gas comprising a series of tanks through which the liquid and gas pass in contact, each of said tanks having a charging eductor and a recirculating eductor operatively associated therewith adapted to deliver to the tank liquid intimately admixed with gas, a conduit communicating with the bottom of each of said tanks and with the recirculating eductor thereof and with the charging eductor of an adjacent tank, and means for withdrawing from the conduit of the last tank in the series an amount of liquid substantially equivalent to the amount of fresh liquid introduced into the first tank in the series.

8. An apparatus for effecting intimate contact between a liquid and a gas comprising a series of tanks through which the liquid and gas pass in contact, each of said tanks having a charging eductor and a recirculating eductor operatively associated therewith adapted to deliver to the tank liquid intimately admixed with gas, a conduit communicating with the bottom of each of said tanks and with the recirculating eductor thereof and with the charging eductor of an adjacent tank, said conduit having flexible sections in the parts thereof communicating with said eductors, a pinch valve operatively associated with each of said flexible sections, and means for withdrawing through the conduit of the last tank in the series an amount of liquid substantially equivalent to the amount of fresh liquid introduced into the first tank in the series.

9. Apparatus for intimately mixing liquids and gases comprising a series of closed tanks adapted to be partly filled with liquid, a conduit connecting the bottom of each tank with the upper end portion of the succeeding tank in the series above the liquid level therein, a pump disposed in said conduit, a Venturi eductor disposed in said conduit adjacent the upper end portion of the succeeding tank, means for introducing gas into said Venturi eductor, a conduit connecting each tank in the series with the succeeding tank in the series above the liquid level in said tanks, means for introducing fresh liquid into at least one eductor in the series, means for introducing fresh gas into at least one tank in the series and means for withdrawing liquid from the series of tanks.

10. Apparatus for intimately mixing liquids and gases comprising a series of closed tanks adapted to be partly filled with liquid, a conduit connecting the lower end portion of each tank with the upper end portion of the succeeding tank in the series above the liquid level therein, a pump disposed in said conduit, a Venturi eductor disposed in the said conduit adjacent the entrance of the conduit into the upper end portion of the succeeding tank in the series, means for supplying liquid continuously to the first tank in the series, means for withdrawing liquid continuously from the last tank in the series, and means for supplying gas continuously to each Venturi eductor in the series.

ARNE J. MYHREN.
BYRON MARQUIS.